(12) United States Patent
Migliori

(10) Patent No.: US 11,007,613 B2
(45) Date of Patent: May 18, 2021

(54) SWIVELING DEVICE

(71) Applicant: UNIVER S.p.A., Milan (IT)

(72) Inventor: Luciano Migliori, Mailand (IT)

(73) Assignee: UNIVER S.P.A., Milan (IT)

( * ) Notice: Subject to any disclaimer, the term of this patent is extended or adjusted under 35 U.S.C. 154(b) by 104 days.

(21) Appl. No.: 16/197,388

(22) Filed: Nov. 21, 2018

(65) Prior Publication Data

US 2019/0152005 A1 May 23, 2019

(30) Foreign Application Priority Data

Nov. 22, 2017 (EP) ..................... 17202973

(51) Int. Cl.
*B23Q 1/52* (2006.01)
*B25J 17/02* (2006.01)
(Continued)

(52) U.S. Cl.
CPC ................ *B23Q 1/525* (2013.01); *B25B 5/16* (2013.01); *B25B 5/163* (2013.01); *B25J 17/0241* (2013.01); *F16M 11/06* (2013.01)

(58) Field of Classification Search
CPC . B25Q 1/525; B25Q 1/52; B25Q 1/54; B25Q 16/001; Y10T 403/32557;
(Continued)

(56) References Cited

U.S. PATENT DOCUMENTS 6,488,273 B2 * 12/2002 Sawdon ................... B23Q 1/52
269/20
9,422,971 B2 * 8/2016 Tran .......................... B25B 5/16
(Continued)

FOREIGN PATENT DOCUMENTS

DE         20214887 U1    2/2003
DE     202011004164 U1    9/2011
(Continued)

OTHER PUBLICATIONS

Calhoon, Jennifer, "DE-STA-CO Electric Pivot Unit Offers Advantages", Jul. 20, 2014, https Home Design World Articles, https://www.designworldonline.com/de-sta-co-electric-pivot-unit-offers-advantages/.
(Continued)

*Primary Examiner* — Lee D Wilson
*Assistant Examiner* — Seahee Hong
(74) *Attorney, Agent, or Firm* — Christopher C. Dremann, P.C.; Christopher C. Dremann

(57) ABSTRACT

A swiveling device includes a housing, an output shaft mounted in the housing and led out of the housing, a drive arranged in the housing for swiveling the output shaft, a swiveling element connected for conjoint rotation to the output shaft in the region thereof which is led out of the housing, and with a receptacle mounted in the swiveling element and connected thereto, wherein the receptacle can be arranged at different angular positions. The swiveling device provides that the swiveling element has a receiving profile for the receptacle, and the receptacle has a mating profile which corresponds to the receiving profile, wherein the receiving profile and the mating profile are configured so that the profiles can be arranged in different positions of receptacle and swiveling element with respect to each other.

14 Claims, 10 Drawing Sheets

(51) Int. Cl.
B25B 5/16 (2006.01)
F16M 11/06 (2006.01)

(58) Field of Classification Search
CPC ..... Y10T 403/32591; Y10T 403/32861; Y10T 403/32918; Y10T 403/12; Y10T 403/125; Y10T 403/32262; Y10T 403/32319; B25B 5/16; B25B 5/163; B25J 17/0241; F16B 2200/10
USPC ...................................... 403/113; 269/69, 32
See application file for complete search history.

(56) References Cited

U.S. PATENT DOCUMENTS

| | | |
|---|---|---|
| 2002/0153650 A1 | 10/2002 | Sawdon et al. |
| 2003/0196824 A1* | 10/2003 | Gass ...................... B25B 23/147 173/131 |
| 2004/0135302 A1* | 7/2004 | Sato .......................... B25B 5/06 269/225 |

FOREIGN PATENT DOCUMENTS

| | | |
|---|---|---|
| DE | 202012013049 U1 | 8/2014 |
| WO | 03/047815 A1 | 6/2003 |
| WO | 2013/104355 A2 | 7/2013 |

OTHER PUBLICATIONS

European Patent Office (EPO), European Patent Application Search Report and Written Opinion, dated May 30, 2018 (May 30, 2108), 12 pages, Munchen, Germany (DE).

* cited by examiner

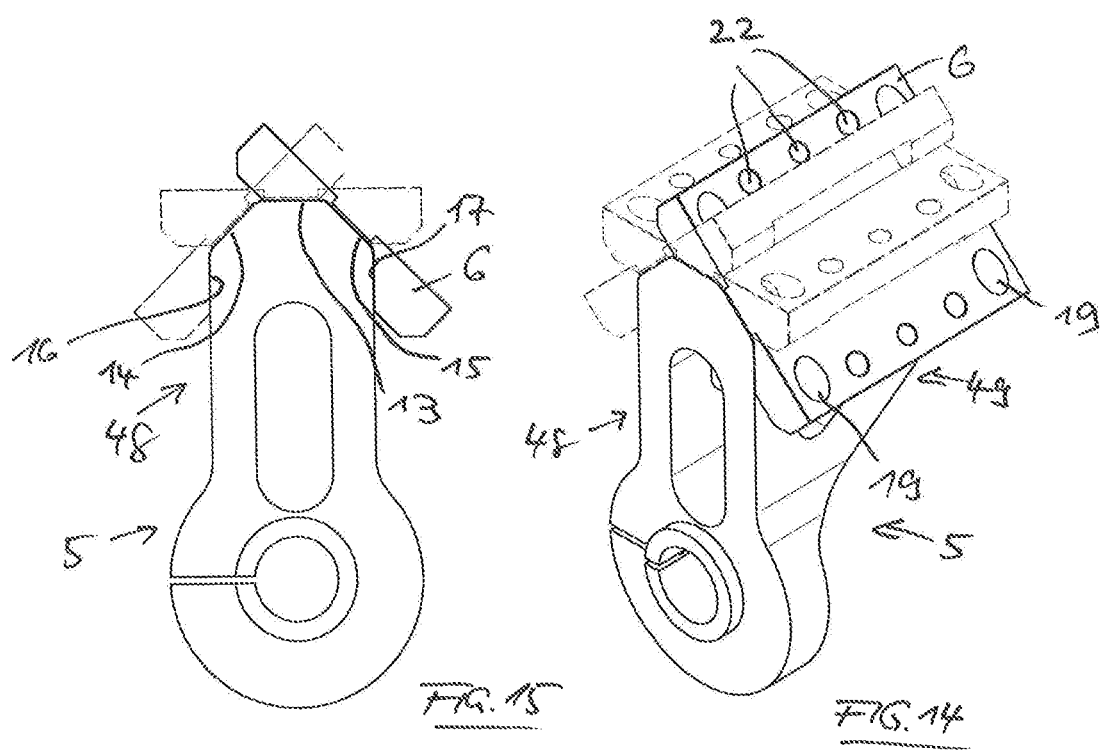

SWIVELING DEVICE

FIELD OF THE INVENTION

The invention relates to a swiveling device, comprising a housing, an output shaft which is mounted in the housing and is led out of same, a drive arranged in the housing for swiveling the output shaft, a swiveling element which is connected for conjoint rotation to the output shaft in the region thereof which is led out of the housing, and with a receptacle which is mounted in the swiveling element and is connected thereto, wherein the receptacle can be arranged at different angular positions.

BACKGROUND OF THE INVENTION AND RELATED ART

Swiveling devices of this type are used in particular in body manufacturing in the motor vehicle industry. In said swiveling devices, the drives differ in configuration and are designed here in particular in a manner acting pneumatically or electrically. In particular, a tool can be connected to the receptacle, which is mounted in the swiveling element and is connected thereto, in order, by means of said tool, to carry out the function of a clamping device, welding tongs, a stamping tool, a clinching tool or a pin locating cylinder.

A swiveling device of the type mentioned at the beginning is known from WO 2013/104355 A2. Said swiveling device has a swiveling element which is in the form of a swiveling arm consisting of two arm parts which are designed to be connectable fixedly to each other in different positions. The arm parts here each have a pattern of holes with through bores and threaded bores and at least partially aligned with each other in different positions, and are designed to be connected to each other with screws. In the case of this swiveling device, two identically oriented swiveling arms which are therefore arranged at the same angular position are provided. The receptacle which is in the form of a receiving plate is connected fixedly, but releaseably, to the two swiveling arms and has a pattern of holes for fastening devices which can be swiveled, and thus tools to be mounted in the receiving plate. The two-part design of the respective swiveling arm has the advantage that, depending on the application, the receiving plate can be arranged at different angular positions. Stockpiling of different swiveling arms having receiving plates arranged differently thereon can therefore be dispensed with. However, the swiveling arm has a complicated configuration since it is in two parts, and the two arm parts forming the swiveling arm have to be provided with the patterns of holes.

A swiveling device is furthermore known from WO 03/047815 A1. In the case of this swiveling device, a worm gearing can be driven via an electric motor. The worm wheel of the worm gearing cooperates with a toggle lever which, for its part, cooperates with an output shaft which is led out of the housing of the swiveling device and is connected for conjoint rotation to a swiveling element. By means of a reversal in the direction of rotation of the electric motor, the swiveling element can be swiveled to and fro. The electric motor is in the form of an AC motor or three-phase motor.

OBJECT AND SUMMARY OF THE INVENTION

It is the object of the present invention to ensure a different angular arrangement of the receptacle in the case of the swiveling device of the type mentioned at the beginning, in a structurally particularly simple manner.

In the case of the swiveling device, it is provided that the swiveling element has a receiving profile for the receptacle, and the receptacle has a mating profile which corresponds to the receiving profile, wherein the receiving profile and the mating profile are configured in such a manner that said profiles can be arranged in different positions of receptacle and swiveling element with respect to each other.

In the case of the swiveling device, it is therefore not required for the respective swiveling element to be of multi-part configuration. It is preferably of single-part configuration, in particular in the form of a single-part swiveling arm, and, owing to the particular design with the receiving profile, is suitable for receiving the receptacle in the region of the mating profile thereof. The possibility of arranging the receiving profile in different positions with respect to the swiveling element and of connecting same to the latter permits different positions of the respective tool to be connected to the receptacle or with respect to a further, different swiveling device to be connected to the swiveling device in the region of the receptacle thereof to be realized. Said different swiveling device can then be designed in a manner corresponding to the first device and can have a receptacle for a tool.

The receptacle is preferably in the form of a receiving plate. Such a receiving plate has particularly large receiving surfaces on both sides in order, firstly, to support the receptacle on the swiveling element and to connect the receptacle to said swiveling element and, secondly, to connect a tool or a further swiveling device to the receptacle.

In principle, the receptacle can be mounted in a single swiveling element. In order to increase the tilting stability of the receptacle, it is, however, considered to be particularly advantageous if the receptacle is mounted in the swiveling element and in a further swiveling element and is connected to said two swiveling elements. The two swiveling elements here in particular have the same receiving profile for the receptacle.

According to an advantageous configuration, the two swiveling elements form part of a common swiveling element unit, wherein the swiveling element unit is connected for conjoint rotation to the output shaft. In the case of this swiveling element unit, the two swiveling elements are arranged in particular in a fork-shaped manner. The swiveling element unit is therefore connected for conjoint rotation to the output shaft in the region of an end of the output shaft that is led out of the housing.

According to another advantageous configuration, it is provided that the two swiveling elements form separate components, wherein the output shaft is led out of the housing on both sides thereof and is connected for conjoint rotation to the region, which is in each case led out of the housing, of the output shaft of one of the swiveling elements, with the same angular orientation of the two swiveling elements. In the case of this configuration, the two swiveling elements are already arranged at a relatively large distance from each other because of the arrangement taking place on both sides of the housing, and therefore the receptacle, in particular the receiving plate, connects said two swiveling elements at a relatively large distance from each other. In the case of this configuration, the relatively large receiving plate is therefore particularly readily suitable for receiving a relatively heavy tool or else a further swiveling device which, for its part, is equipped with a tool.

A structurally particularly simple configuration of the respective swiveling element is produced if the latter is in the form of a swiveling arm. It is therefore only required to design the respective swiveling element as a relatively simply configured structure which is connected in the region of one end to the output shaft for conjoint rotation and receives the receptacle or receiving plate in the region of the other end.

The receptacle can be connected to the respective swiveling element in a particularly simple manner if this takes place by means of screws. This permits a simple and uncomplicated installation and also removal of the receptacle with respect to the swiveling element.

According to a particular exemplary embodiment of the invention, it is provided that the receptacle has a central portion in a first plane and two lateral portions which are arranged on averted sides of said portion and the planes of which are arranged at identical angles to the first plane. In this exemplary embodiment, it is furthermore provided that the respective swiveling element has a central portion and two inner lateral portions, wherein said inner lateral portions are designed and arranged in a manner corresponding to the lateral portions of the receptacle. Finally, it is provided in this exemplary embodiment that the respective swiveling element has two outer lateral portions which are arranged on sides of the two inner lateral portions, which sides are averted from the central portion of the respective swiveling element, wherein planes of the two outer lateral portions are arranged at identical angles to the planes of the inner lateral portions, wherein said angles correspond to the angles of the planes between the inner lateral portions and the central portion of the respective swiveling element.

Two planes which are arranged in a defined manner with respect to each other are therefore formed in the receptacle. Five planes which are arranged in a defined manner with respect to one another are formed in the swiveling element. The respective planes of the receptacle, the respective planes of the swiveling element and also the respective planes of the receptacle, on the one hand, and the swiveling element, on the other hand, are arranged in a defined manner with respect to one another, and therefore the two planes of the receptacle are always in contact with two of the five planes of the swiveling element, irrespective of the selected swiveling positions of the three possible relative swiveling positions of the receptacle with respect to the swiveling element. In one position, the receptacle with the two lateral portions thereof lies against the two inner lateral portions of the swiveling element. In the respective further one of the two other positions, the one lateral portion of the receptacle lies against the central portion of the swiveling element and the other lateral portion of the receptacle lies against the outer lateral portion of the swiveling element.

With regard to the angular position of the portions with respect to one another, it is considered to be particularly advantageous if in the case of the receptacle, the lateral portions thereof with respect to the planes thereof enclose an angle of 30° to 45°, in particular of 45° with the plane of the central portion of the receptacle, furthermore, in the case of the respective swiveling element, the inner lateral portions thereof with respect to the planes thereof enclose an angle of 30° to 45°, in particular of 45° with the plane of the central portion of the respective swiveling element, furthermore, in the case of the respective swiveling element, the outer lateral portions thereof with respect to the planes thereof enclose an angle of 30° to 45°, in particular of 45° with the plane of the facing inner lateral portion.

At the angle mentioned of 30°. three different angular positions of receptacle and swiveling element can therefore be set and covers a total angle of 60°, thus −30°, 0° and +30°, while, at an angle of 45°, a total angle of 90° can be covered, with arrangements of receptacle with respect to swiveling element of −45°, 0° and +45°.

With regard to end positions of the swiveling element, specifically a first swiveling end position of the swiveling element, which swiveling end position corresponds, for example, to an opening position of the tool, and the other swiveling position of the swiveling element, which swiveling position corresponds, for example, to a closed position of the tool, by means of the configuration according to the invention of the swiveling device different basic positions of the tool can be realized on the basis of the different possible arrangement of the receptacle with respect to the respective swiveling element. This considerably increases the universal usability both of the swiveling device and of the tool received by the latter or further swiveling device received by the latter.

In particular, the swiveling device is designed in such a manner that the receptacle makes contact with the respective swiveling element in the region of end-side planes of the swiveling element that are arranged parallel to the swivel axis of the output shaft. This results in a movement in which the tool or a swiveling device received by the swiveling device during the swiveling of the respective swiveling element in a plane arranged parallel to the swivel axis of the output shaft is moved with respect to the swiveling device. This constitutes a simple assignment of the swiveling device, which is customarily held in a robot arm, and of the movement of the tool mounted in the swiveling device or further swiveling device mounted in the swiveling device.

The receptacle or receiving plate is fastened to the swiveling element or to the swiveling elements in a particularly simple manner by threaded bores passing through the end-side planes of the respective swiveling element, and the receptacle being provided with holes for receiving screws which can be screwed into the threaded bores.

A tool, preferably welding tongs, a stamping tool, a clinching tool or a pin locating cylinder, in particular for use in body manufacturing in the motor vehicle industry, can preferably be connected to the receptacle. The connection takes place in particular by screwing together tool and receptacle. Alternatively, a swiveling device for a tool can be connected, in particular can be screwed, to the receptacle.

In respect of the driving technology of the swiveling device, it is considered to be particularly advantageous if the drive has an electric motor, in particular a stepping motor or brushless motor. Driving technology in which use is made of a toggle lever which is in a position beyond the dead center in an end position of the swiveling arm is therefore not provided. On the contrary, the electric motor positions the respective swiveling lever in the desired position. By means of the electric motor, in particular stepping motor, the respective swiveling lever can not just be swiveled to and fro. It is entirely possible to swivel the swiveling lever over an angle which is greater than 360°.

Under the aspect of driving technology, it is furthermore considered to be particularly advantageous if the swiveling device has a gearing, preferably a worm gearing, in particular a worm gearing with an intermediate gearing mounted upstream, wherein the output shaft can be driven by means of the electric motor via the gearing. This makes it possible to achieve a large reduction in the rotational speed of the electric motor in order to achieve swiveling of the swiveling element at a precise angle.

Further features of the invention will be apparent from the following detailed description of one or more exemplary embodiments, the description of the figures and in the figures themselves.

BRIEF DESCRIPTION OF THE DRAWING FIGURES

The invention is illustrated in the figures with reference to one or more exemplary embodiments without being restricted to the embodiments described herein.

FIG. 14 shows, for the exemplary embodiment according to FIG. 13, the swiveling element which is used there, with a receptacle which is connected to said swiveling device, illustrated in lower connecting positions of receptacle and swiveling element.

FIG. 15 shows the arrangement according to FIG. 14 in a view in the direction of an output shaft of the swiveling device which receives the swiveling element.

DETAILED DESCRIPTION OF EXEMPLARY EMBODIMENTS OF THE INVENTION

Figure 1:
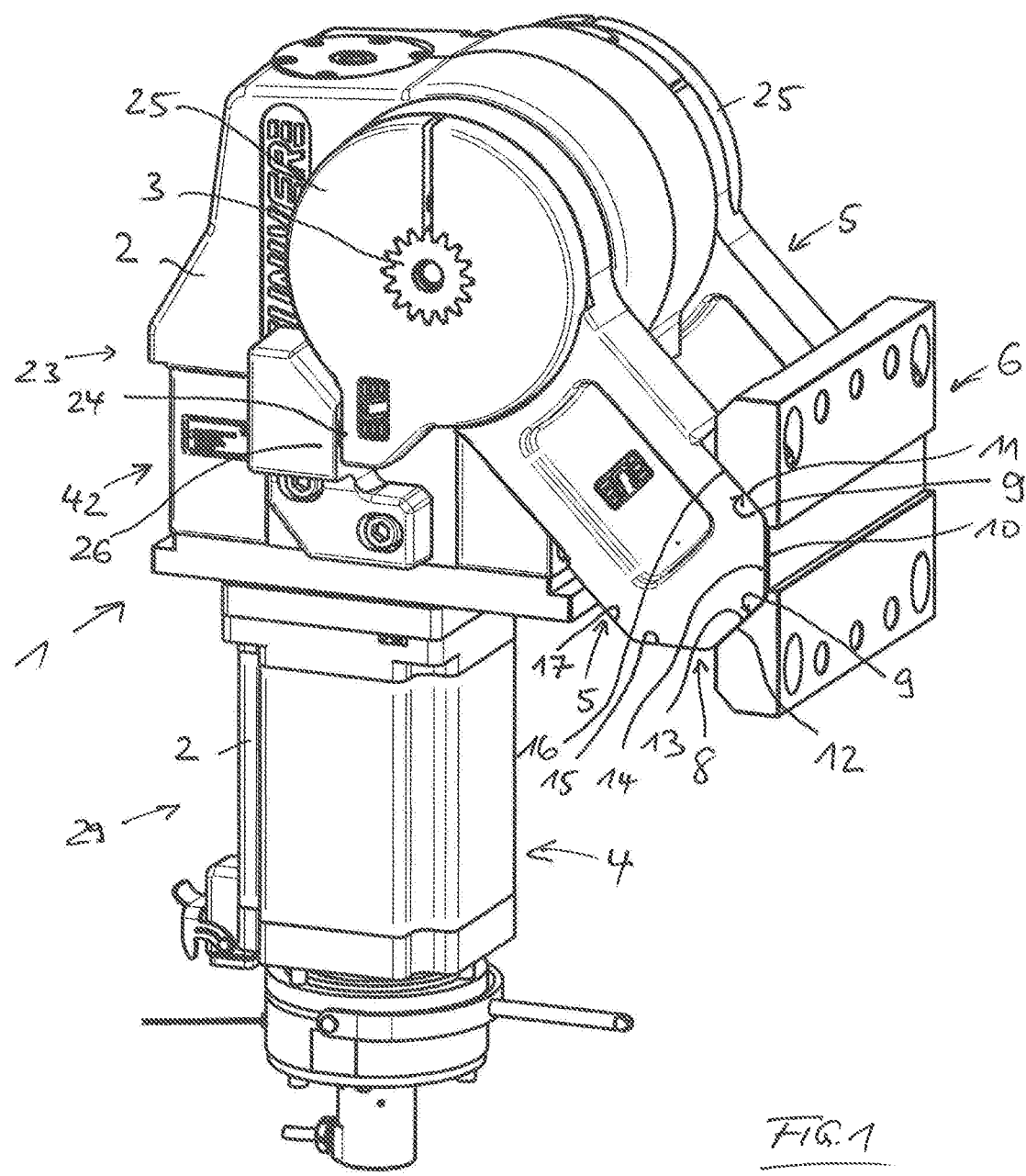
FIG. 1 shows a first exemplary embodiment of a swiveling device, in a three-dimensional illustration.
Figure 2:
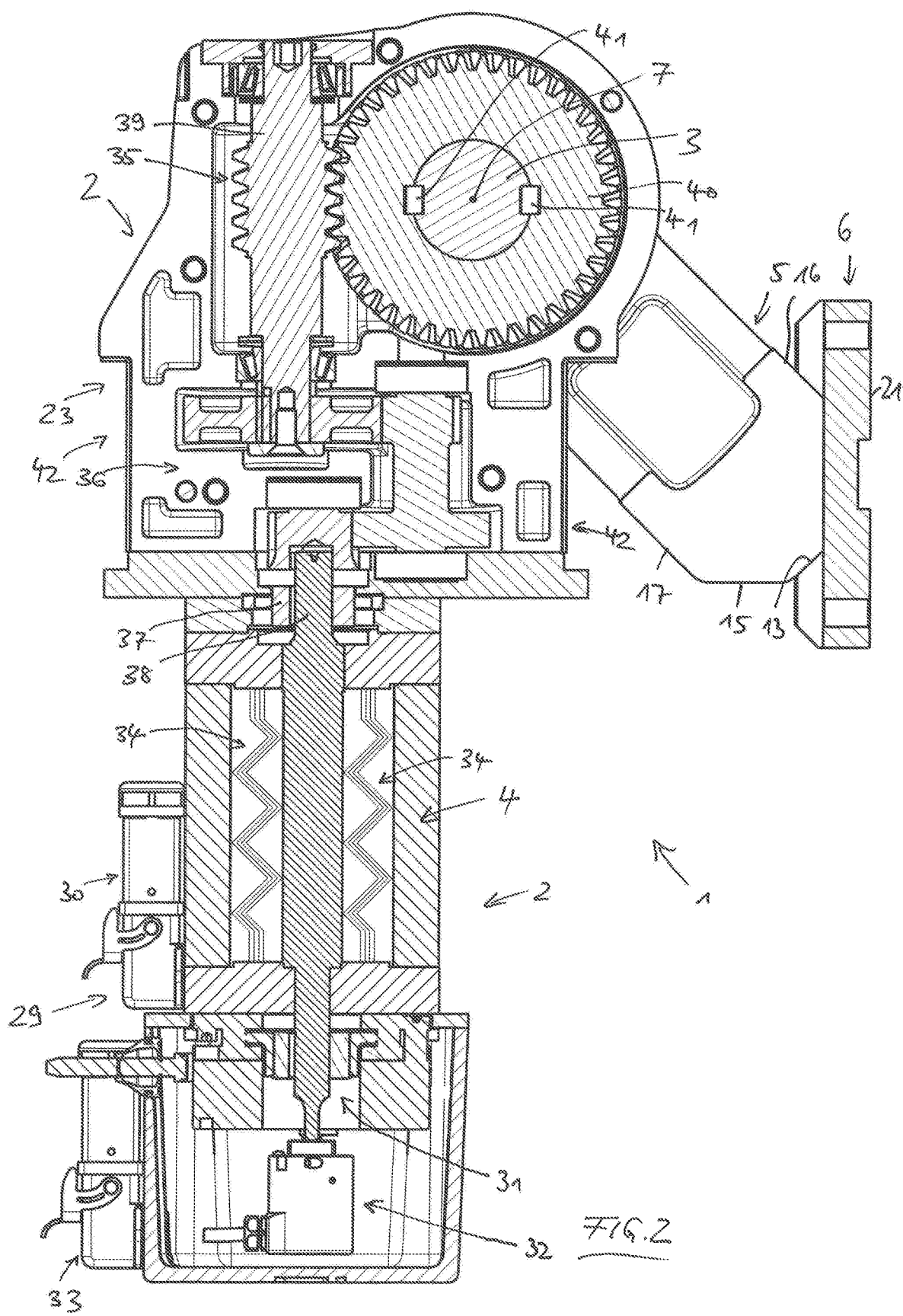
FIG. 2 shows a longitudinal center section through the swiveling device shown in FIG. 1.

The first exemplary embodiment, which is illustrated in FIGS. 1 and 2, shows a swiveling device 1, with a housing 2, an output shaft 3 which is mounted in the housing 2 and is led out of same on both sides, a drive 4 arranged in the housing 2 for swiveling the output shaft 3, two swiveling elements 5 which are connected for conjoint rotation to the output shaft 3 in the region thereof which is led out of the housing 2, and also with a receptacle 6 which is mounted in the swiveling elements 5 and is connected thereto, wherein the receptacle 6 can be arranged at different angular positions parallel to the axis of rotation 7 of the output shaft 3.

The receptacle 6 is in the form of a receiving plate here. The two swiveling elements 5 form separate components. One of the swiveling elements 5, which are each in the form of a swiveling arm, is connected for conjoint rotation to the region of the output shaft 3 that is in each case led out of the housing 2, at the same angular orientation of the two swiveling elements 5. The swiveling elements 5 are axially fixed with respect to the output shaft 3. The receptacle 6 is mounted in the two swiveling elements 5 and connected thereto. The swiveling elements 5 are of identical design. The respective swiveling element 5 has a receiving profile 8 for the receptacle 6, and the receptacle 6 has a mating profile 9 which corresponds to the receiving profile 8. The receiving profile 8 and the mating profile 9 are configured in such a manner that said profiles can be arranged in different positions of receptacle 6 and swiveling element 5 with respect to each other.

The receptacle 6 is mounted in the two swiveling elements 5 and is connected thereto. The two swiveling elements 5 have the same receiving profile 8 for the receptacle 6.

The receptacle 6 has a central portion 10 in a first plane and two lateral portions 11, 12 which are arranged on averted sides of said portion 10 and the planes of which are arranged at identical angles to the first plane. Furthermore, the respective swiveling element 5 has a central portion 13 and two inner lateral portions 14, 15 which are designed and arranged in a manner corresponding to the portions of the receptacle 6. Finally, the respective swiveling element 5 has two outer lateral portions 16, 17 which are arranged on the sides of the two inner lateral portions 14, 15, which sides are averted from the central portion 13 of the respective swiveling element 5, wherein planes of the two outer lateral portions 16, 17 are arranged at identical angles to the planes of the inner lateral portions 14, 15. Said angles correspond to the angles of the planes between the inner lateral portions 14, 15 and the central portion 13 of the respective swiveling element 5. Specifically, in the case of the receptacle 6, the lateral portions 11, 12 thereof with respect to their planes enclose an angle of 45° with the plane of the central portion 10 of the receptacle 6. Furthermore, in the case of the respective swiveling element 5, the inner lateral portions 14, 15 thereof with respect to the planes thereof enclose an angle of 45° with the plane of the central portion 13 of the respective swiveling element 5, and, in the case of the respective swiveling element 5, the outer lateral portions 16, 17 thereof with respect to the planes thereof enclose an angle of 45° with the plane of the facing inner lateral portion 14, 15.

The receptacle 6 makes contact with the respective swiveling element 5 in the region of end-side planes of the swiveling element 5 that are arranged parallel to the swivel axis 7 of the output shaft 3.

Threaded bores 18 pass through the end-side planes of the respective swiveling element 5 that are formed by the portions 13 to 17. The receptacle 6 is provided with holes 19 in the region of the planes assigned to the portions 10 to 12, for receiving screws 20 which can be screwed into the threaded bores 18. Specifically, the receiving plate 6 has four holes 19 for receiving the screws 20. Said holes 19 are arranged with their longitudinal axes at an angle of 45° to a plane 21 of the receiving plate 6, wherein said plane 21 is averted from the swiveling elements 5. Said plane 21 is provided with six threaded bores 22. A tool held by the swiveling device 1 or a further swiveling device held by the swiveling device 1 is mounted and fastened in the region of said plane 21 and the threaded bores 22. These components are screwed to each other. The respective tool is preferably a tool which is used in body manufacturing in the motor vehicle industry, such as a clamping device, welding tongs, a stamping tool, a clinching tool or a pin locating cylinder.

Figure 3:
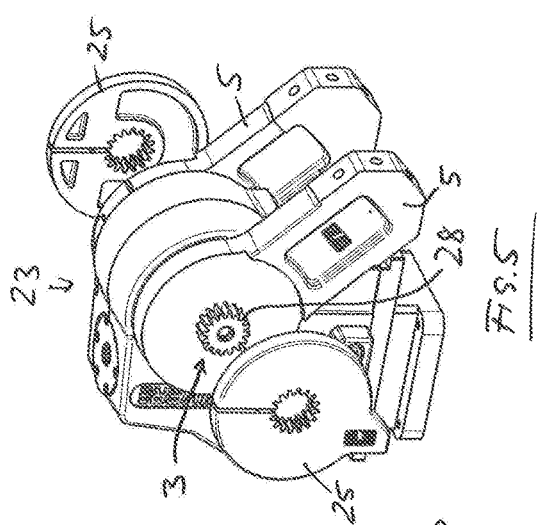
FIGS. 3 to 8 show, for a head part of the swiveling device shown in FIG. 1, the removal and mounting of a receptacle with two swiveling elements which are connected to an output shaft of the swiveling device and are in the form of swiveling arms.
Figure 17:
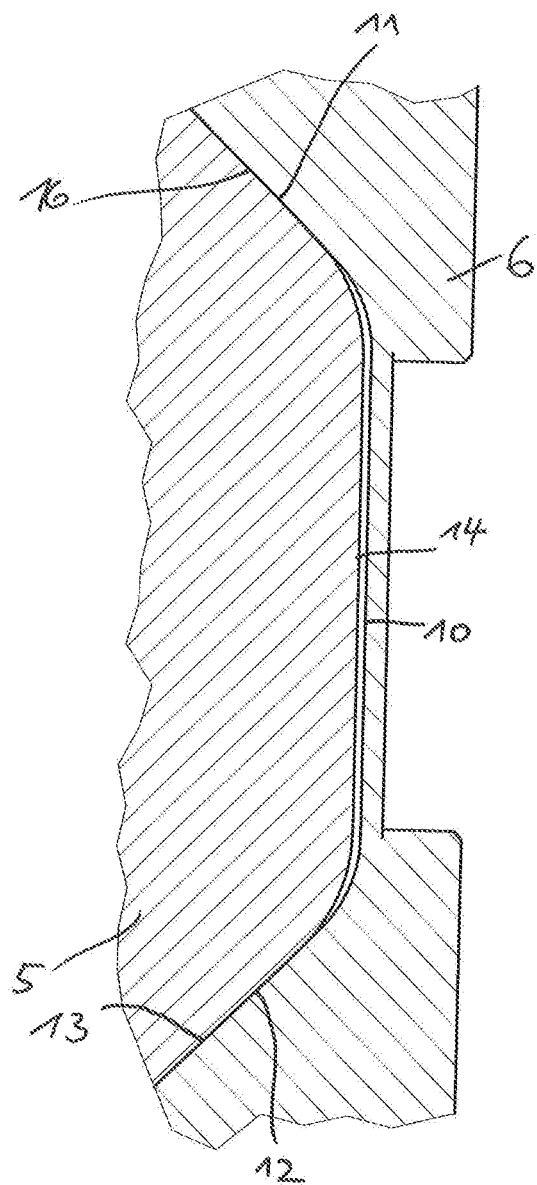
FIG. 17 shows, in a sectional illustration, the cooperation of the portions of receptacle and respective swiveling element.

FIGS. 3 to 8 show, regarding a partial region of the swiveling device 1, specifically a head part 23 of the swiveling device 1, the removal of the receptacle 6 with respect to the two swiveling elements 5 and the subsequent installation of said receptacle 6 after the angular position of the two swiveling elements 5 is changed. FIG. 3 shows the two swiveling elements 5 in an end position in which said swiveling elements are pivoted downwards at an angle of 45° to a horizontal plane passing through the axis of rotation 7 of the output shaft 3. In said end position, cover supports 24 of two disks 25 plugged onto the output shaft 3 make contact with two stops 26 of a housing portion 27, forming part of the housing 2, of the head part 23. In this position of the two swiveling elements 5, the receptacle 6, specifically the plane 21 of the receiving plate 6, is positioned in a vertical plane. The lateral portion 11 of the receptacle 6 makes contact here with the outer lateral portion 16 of the respective swiveling element 5, and the lateral portion 12 of the receptacle 6 makes contact with the central portion 13 of the respective swiveling element 5. The central portion 10 of the receptacle 6 is, as can be gathered from the illustration of FIG. 17, arranged at a small distance from the inner lateral portion 14, which is assigned to said portion, of the respective swiveling element 5 in order to avoid a kinematically over determined mounting of the receptacle 6 in the respective swiveling element 5.

Figure 4:
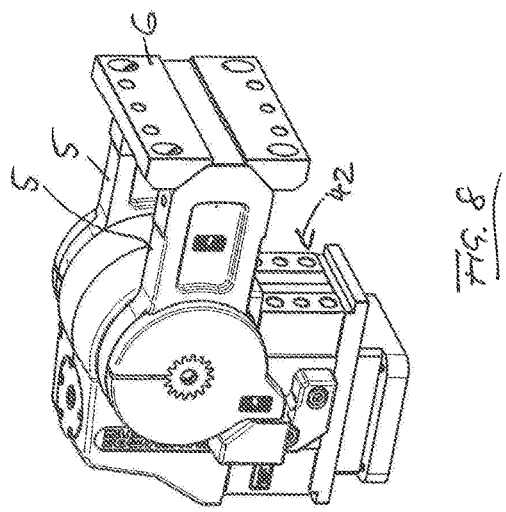
Figure 5:
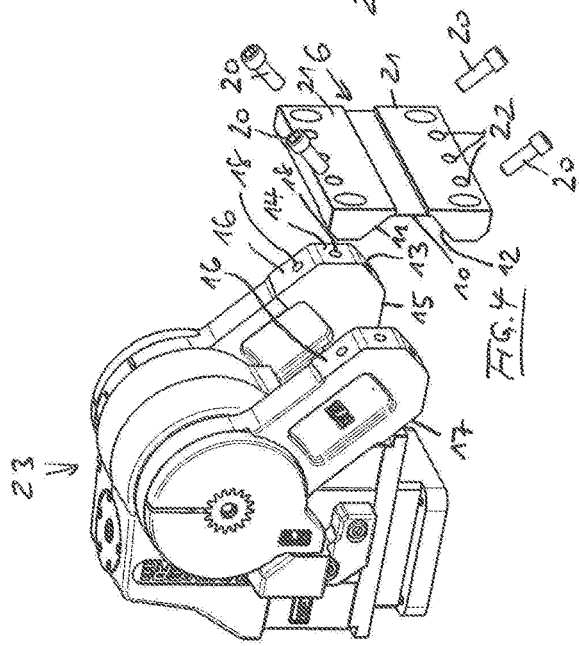
Figure 7:
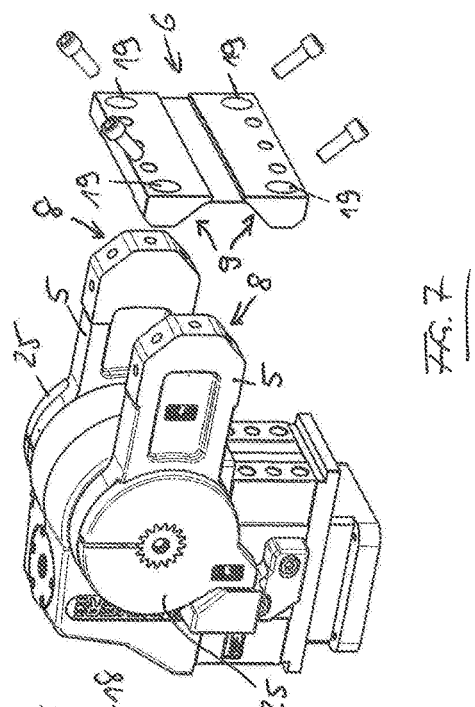
Figure 6:
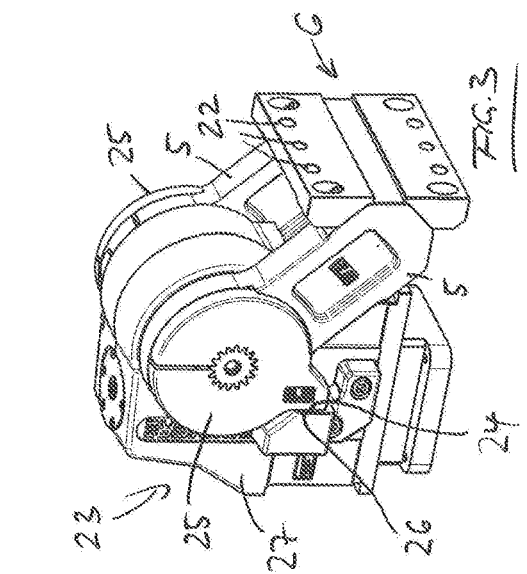
Figure 8:
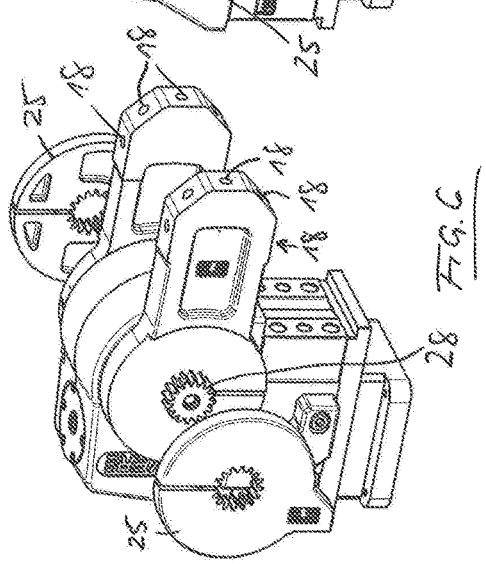

Starting from this position, as is illustrated with respect to FIG. 4, the four screws 20, by means of which the receptacle 6 is connected to the two swiveling elements 5, are released and then the two disks 25 are also released with respect to the output shaft 3 and pulled off, as illustrated in FIG. 5. By swiveling the output shaft 3, the two swiveling elements 5 are then swiveled by 45° counter-clockwise, and therefore the swiveling elements 5 are now positioned in a horizontal plane. This is shown in FIG. 6. The two disks 25 are subsequently plugged again onto the tooth portions of the output shaft 3, upon contact being made by respective cover support 24 and stop 26, as is shown in FIG. 7. The receptacle 6 is subsequently screwed again to the ends of the swiveling elements 5 by means of the four screws 20, wherein now, in contrast to the starting state in which the receptacle 6 with the portions 11 and 12 has made contact with the portions 16 and 13 of the respective swiveling element 5, the portions 11 and 12 of the receptacle 6 now make contact with the portions 14 and 15 of the respective swiveling element 5. This state is shown in FIG. 8.

An alternative third position of receptacle 6 and swiveling elements 5 would be possible on the basis of the predetermined design of the portions 10 to 17 to the effect that the portions 11 and 12 of the receptacle 6 make contact with the portions 13 and 17 of the respective swiveling element 5.

Figures 9, 10:
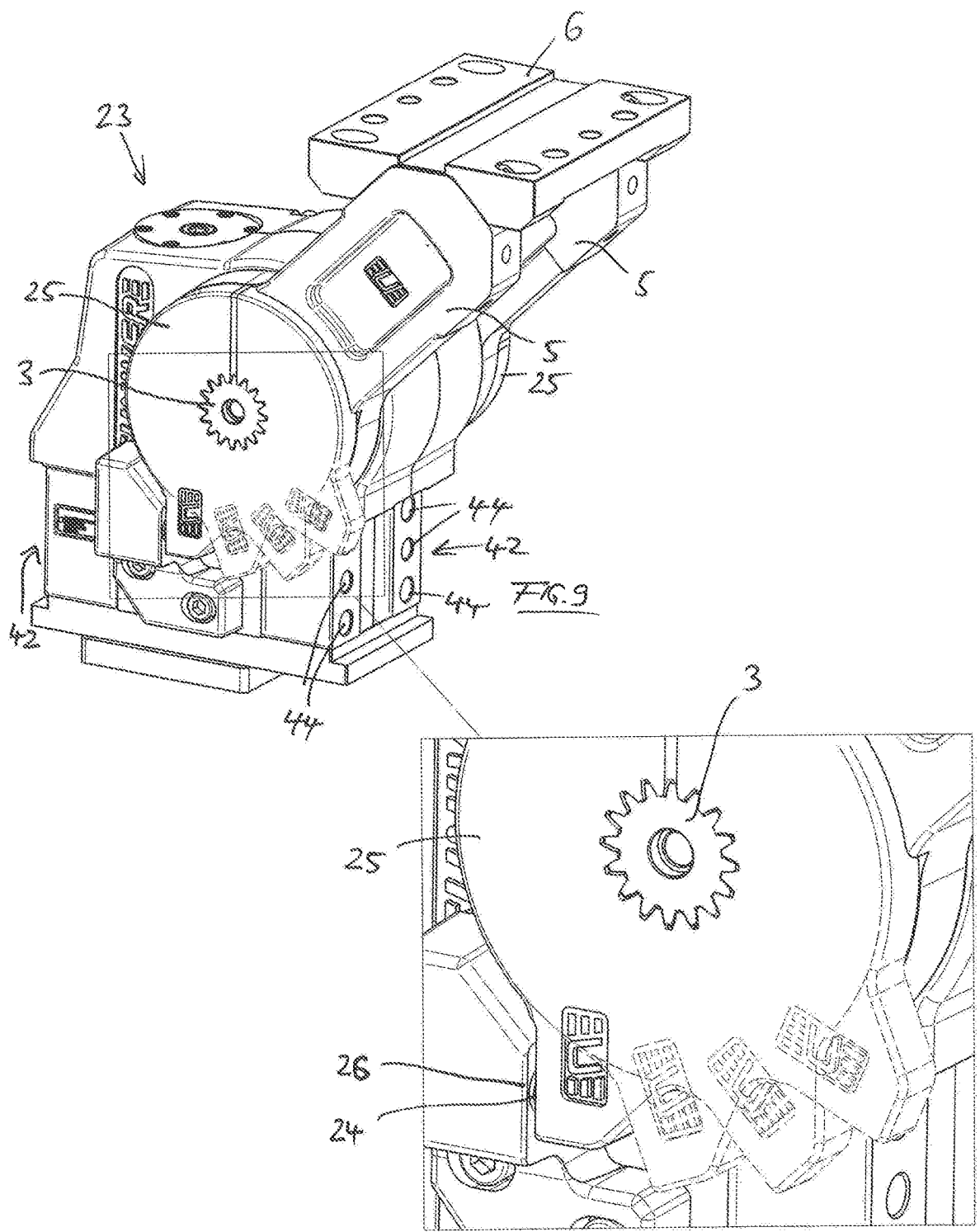
FIG. 9 shows the swiveling device, shown for the region of the head part of the swiveling device, in a three-dimensional illustration.
FIG. 10 shows an enlarged illustration of the region framed in FIG. 9.

As can be gathered in particular from the illustration of FIGS. 9 and 10, the stop 26 assigned to the respective disk 25 and therefore to the respective swiveling element 5 defines a swiveling end position of the swiveling element 5 upon contact with the associated cover support 24 of the head part 23. Said swiveling end position is, for example, an open position of the tool, into which the swiveling elements 5 are moved by means of the drive 4. Said stop position can be changed by plugging the disks 25 onto the tooth portions 28 of the output shaft 3 differently with respect to angle, as is illustrated in FIGS. 9 and 10 by the different positions (illustrated by dashed lines) of the disks 25.

Figure 11:
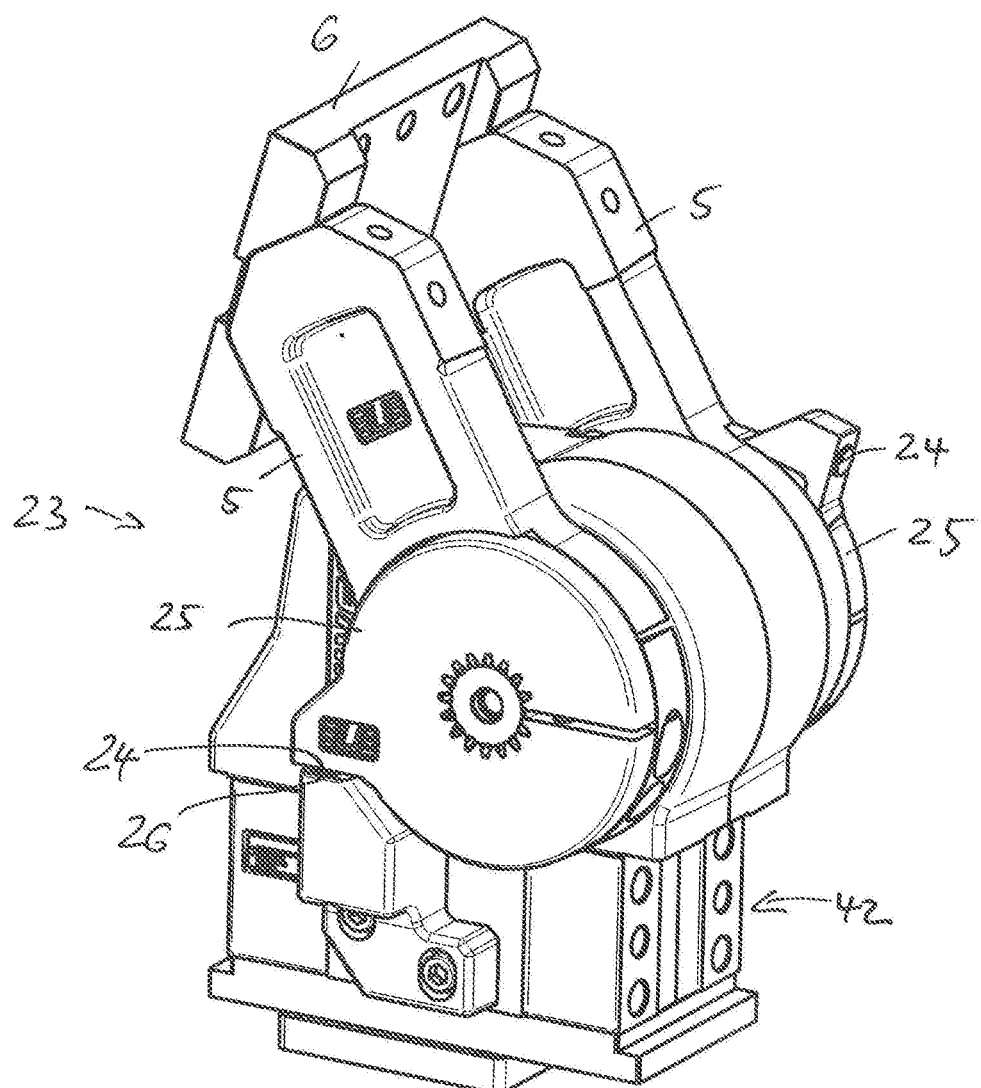
FIG. 11 shows a second exemplary embodiment of the swiveling device, in a three-dimensional illustration.

FIG. 11 shows, in a different orientation of the respective disk 25, in which the other main plane of the disk 25 faces the swiveling element 5, the variant in which the respective disk 25 defines a stop position in the opposite swiveling direction of the respective swiveling element 5 in relation to the exemplary embodiment according to FIG. 1. This is in particular a stop position which corresponds to the closed position of the tool. It is shown that the cover support 24 of the respective disk 25 cooperates with another stop 26 of the head part 23. In the case of the other disk 25, the position thereof is maintained in accordance with the exemplary embodiment according to FIG. 1, and therefore, in the case of the exemplary embodiment according to FIG. 11, the one disk 25 delimits the closed position and the other disk 25 delimits the open position.

Regarding the first exemplary embodiment according to FIG. 1, FIG. 2 illustrates the design of the swiveling device 1.

The swiveling device 1 has the head part 23 and a drive part 29. The drive part 29 has a housing portion 30 and the drive 4 which is received by the latter and is the electric motor, specifically stepping motor. Furthermore, the drive part 29 has connections 30 for the stepping motor, a brake 31, an encoder 32 and connections 33 for brake/encoder. The encoder 32 is a self-driven multi-range encoder, and therefore a supply by means of a buffer battery is not required. The electrical winding of the electric motor is denoted by reference sign 34.

A worm gearing 35 and an intermediate gearing 36 are mounted in the housing portion 27 of the head part 23. The head part 23, in the region of its end facing the drive part 29, has a shaft 37 which has a recess for receiving a rotor shaft 38 of the stepping motor for conjoint rotation. When the stepping motor is actuated, the rotor shaft 38 is rotated over a defined angle and the shaft 37 correspondingly rotates. Said shaft is part of an intermediate gearing 36 which is in the form of a spur gearing and cooperates on the output side for conjoint rotation with a worm shaft 39, which is mounted in the housing portion 27, of the worm gearing 35. The worm shaft 39 meshes with a worm wheel 40 of the worm gearing 35. The worm wheel 40 is mounted in the output shaft 3 and is connected for conjoint rotation to the output shaft 3 via adjustment springs 41. The rotational movement of the rotor shaft 38 is therefore transmitted to the output shaft 3 in a rotational-speed-reduced and play-free manner and therefore brings about a corresponding swiveling movement of the swiveling element 5.

This described configuration of head part 23 and drive part 29 of the swiveling device 1 is applicable to all embodiments of the swiveling device 1.

The swiveling device 1 is fastened in the region of the housing portion 27 of the head part 23 to a robot arm. For this purpose, the housing portion 27 is provided with various offsets 42 which each form a contact surface 43 for receiving the robot arm. In the region of said contact surface 43, the housing portion 27 is provided with various threaded bores 44 for receiving screws for the purpose of screwing together robot arm and swiveling device 1.

Figure 12:
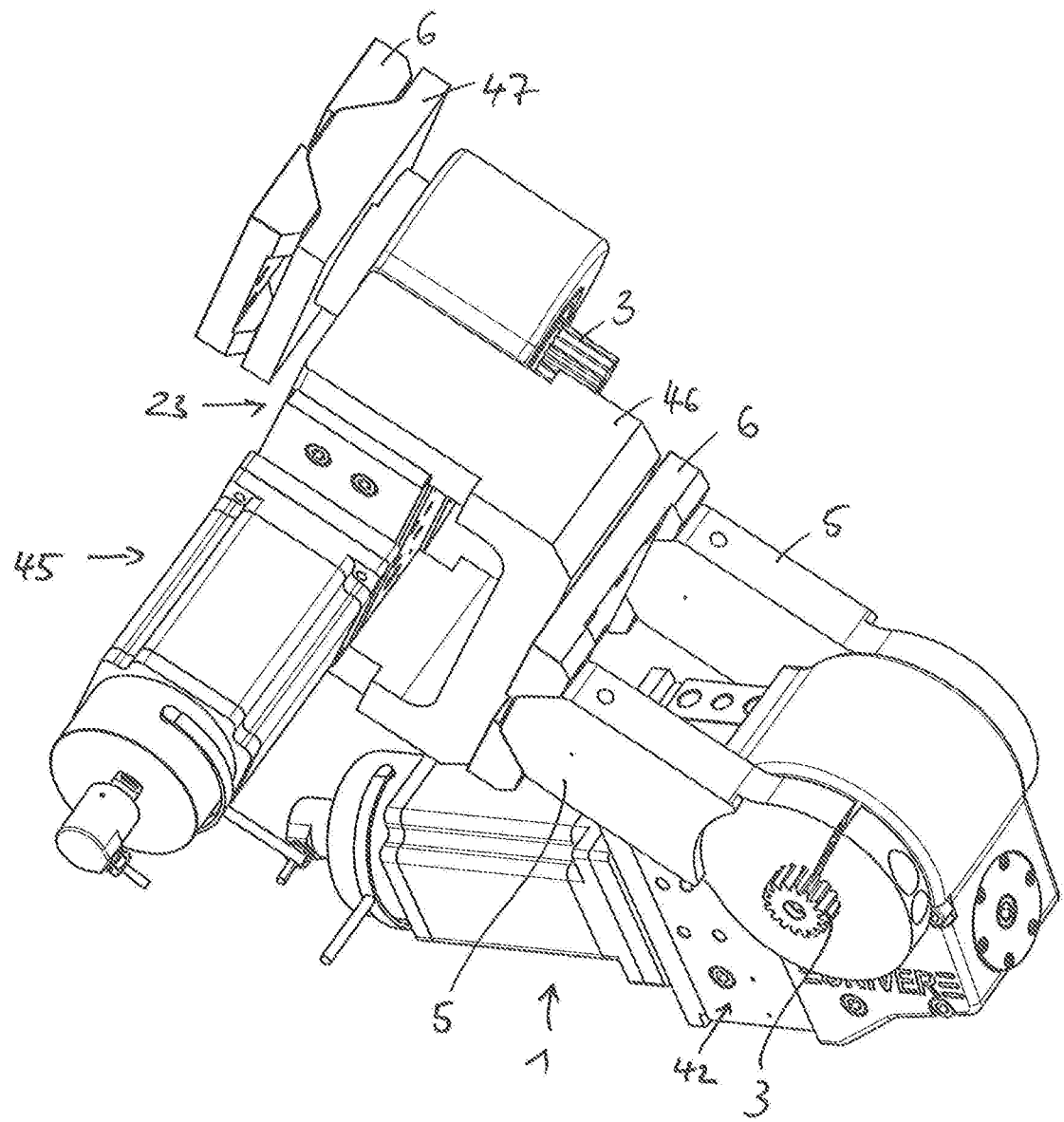
FIG. 12 shows a third exemplary embodiment of the swiveling device which receives a further swiveling device, in a three-dimensional illustration.

The exemplary embodiment according to FIG. 12 illustrates the mounting of a further swiveling device 45 in a swivelable manner in the swiveling device 1. The two swiveling devices are of identical design except for the region which adjoins the respective output shaft 3 on the output side. The swiveling device 1 is mounted in a robot arm. A U-shaped bearing unit 46 is mounted in the receptacle 6 of the swiveling device 1 and is screwed to said receptacle 6. The bearing unit 46 makes contact with the head part 23 of the further swiveling device 45 on averted contact surfaces 43 and is screwed there to the head part 23. On the side averted from the swiveling device 1, the output shaft 3 of the swiveling device 45 has a bearing plate 47 which is secured for conjoint rotation and also axially with respect to said output shaft 3. Said bearing plate has a profiling which is complementary to the described profiling of the receptacle 6 which is likewise used in the case of the swiveling device 45 and is screwed to the bearing plate 47. The receptacle 6 of the swiveling device 45 serves in the described manner for the screwed receiving of a tool.

Figure 13:
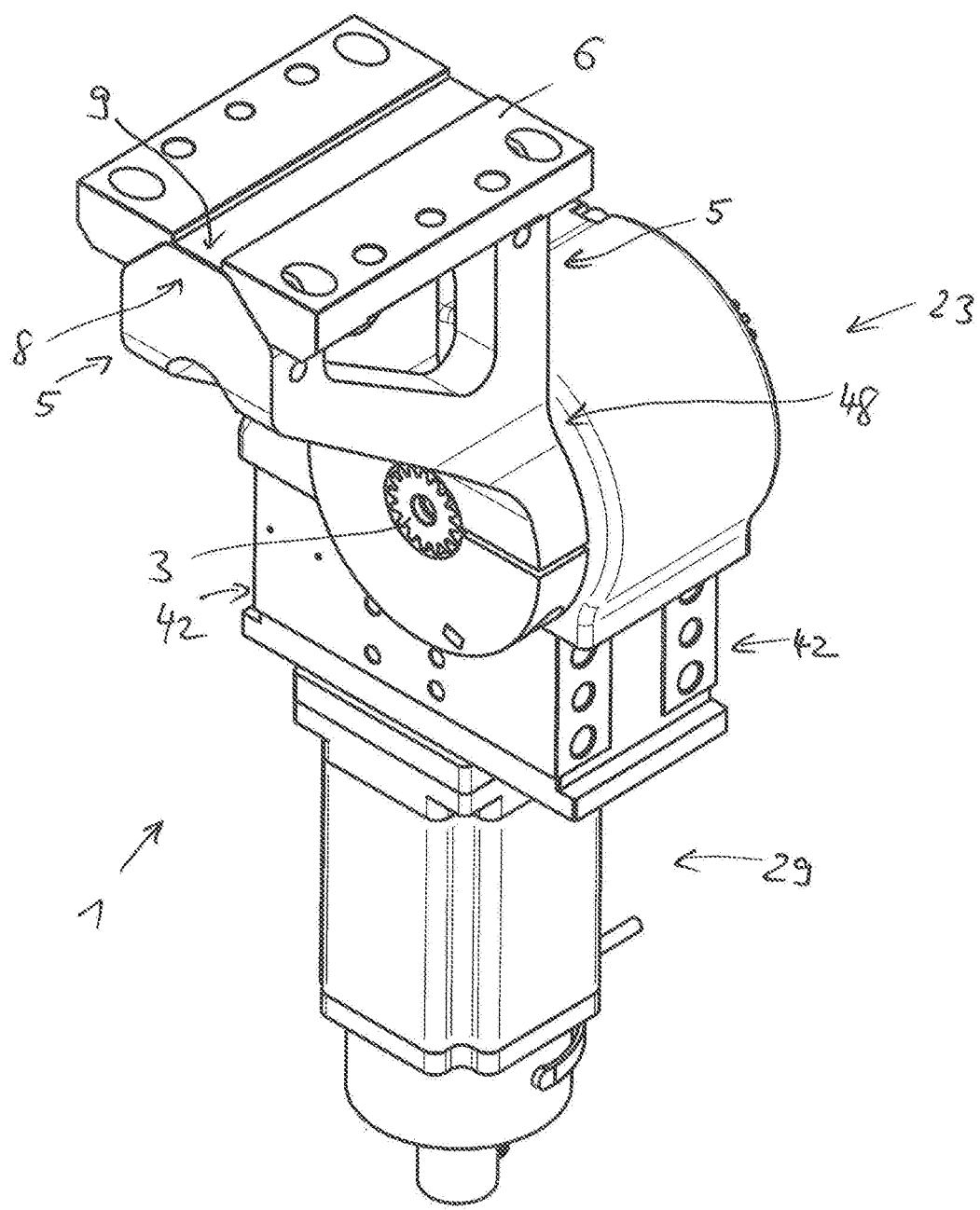
FIG. 13 shows a fourth exemplary embodiment of the swiveling device, in a three-dimensional illustration.

The exemplary embodiment according to FIG. 13 differs from that according to FIG. 1 in that, instead of two swiveling elements 5 arranged on either side of the housing 2 or housing portion 37, a swiveling element unit 48 is provided which has two swiveling elements 5 and is connected in the region of an end of the output shaft 3 to the latter for conjoint rotation and in an axially secured manner. The swiveling element unit 48 is widened, starting from the output shaft 3, in a fork-shaped manner, wherein the two swiveling elements 5 are each provided in the region of the free fork ends with a receiving profile 8 which cooperates with the mating profile 9 of the receptacle 6. The receptacle 6 or receiving plate is therefore supported at both ends in the swiveling elements 5 and is fastened there by means of the four screws 20, corresponding to the fastening in the case of the exemplary embodiment according to FIG. 1.

FIGS. 14 and 15 illustrate, for the exemplary embodiment according to FIG. 13, the three different possible fastening positions of the receptacle 6 with respect to the fork portions 48, 49 of the swiveling element 5.

Figure 16:
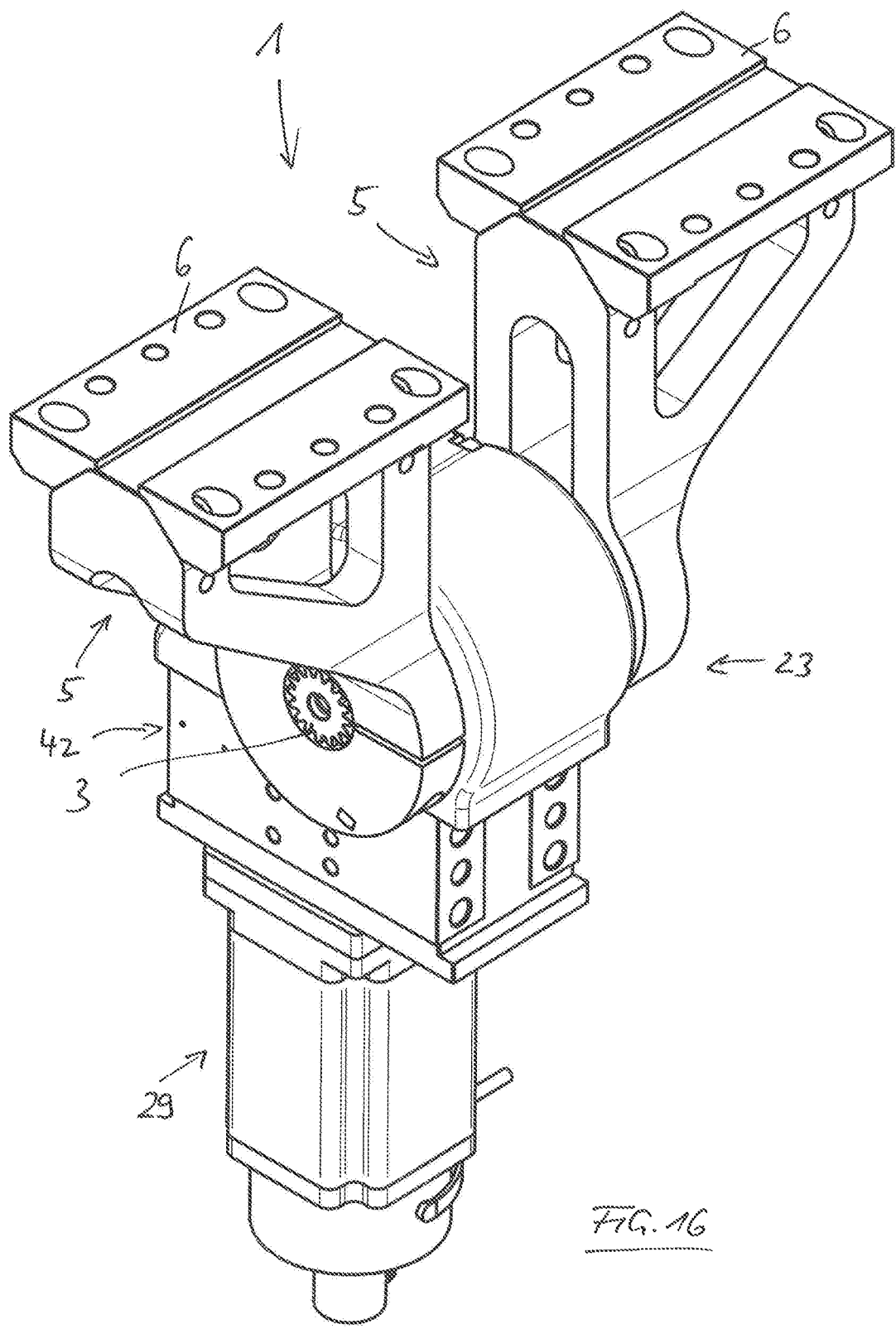
FIG. 16 shows a fifth exemplary embodiment of the swiveling device in a three-dimensional illustration.

The exemplary embodiment according to FIG. 16 differs from that according to FIGS. 13 to 15 only in that not only is the swiveling element 5 connected to that region of the output shaft 3 which is led out of the housing portion 27 of the housing 2, but a corresponding swiveling element is also connected to the other led-out end of the output shaft 3. The orientation of the two swiveling elements 5 is identical here, and therefore basically a common, relatively large and also entirely very heavy tool can be mounted in the two receptacles 6, which are connected to the two swiveling elements 5, by said tool being fastened, and therefore screwed, to the receptacles 6 in the described manner.

That which is claimed is:

1. A swiveling device comprising a housing, an output shaft mounted in the housing and led out of the housing, a drive arranged in the housing for swiveling the output shaft, a swiveling element connected for conjoint rotation to the output shaft in the region of the output shaft led out of the housing, and a receptacle connected to the swiveling element, wherein the receptacle is configured to be arranged in different angular positions, wherein the swiveling element has a receiving profile for the receptacle and the receptacle has a mating profile which corresponds to the receiving profile, wherein the receiving profile and the mating profile are configured in such a manner that said receiving profile and said mating profile are configured to be arranged in different positions of the receptacle and the swiveling element with respect to each other, wherein the receptacle has a central portion in a first plane and two lateral portions arranged on averted sides of said central portion with planes of the lateral portions arranged at identical first angles to the first plane of the central portion, wherein the swiveling element has a central portion and two inner lateral portions arranged in a manner corresponding to the central portion and the lateral portions of the receptacle, wherein the swiveling element has two outer lateral portions arranged on the two inner lateral portions that are averted from the central portion of the swiveling element, wherein planes of the two outer lateral portions are arranged at identical second angles to planes of the inner lateral portions, wherein the identical second angles correspond to identical third angles of the planes between the inner lateral portions and a plane of the central portion of the swiveling element, and wherein the receptacle makes contact in the region of the lateral portions of the receptacle with the inner lateral portions of the swiveling element or with the central portion and one of the outer lateral portions of the swiveling element.

2. The swiveling device as claimed in claim 1, wherein the receptacle is in the form of a receiving plate.

3. The swiveling device as claimed in claim 1, wherein the swiveling element comprises a first swiveling element and a second swiveling element, wherein the receptacle is mounted in the first swiveling element and in the second swiveling element and is connected to the first and the second swiveling elements, and wherein the first and the second swiveling elements have the same receiving profile for the receptacle.

4. The swiveling device as claimed in claim 3, wherein the first and second swiveling elements form separate components, and wherein the output shaft is led out of the housing on both sides of the housing and is connected for conjoint rotation to one of the first and second swiveling elements on each side of the housing, with the same angular orientation of the first and second swiveling elements.

5. The swiveling device as claimed in claim 1, wherein the swiveling element comprises a first swiveling element and a second swiveling element, and wherein the first and second swiveling elements form part of a common swiveling element unit that is connected for conjoint rotation to the output shaft.

6. The swiveling device as claimed in claim 1, wherein the swiveling element is in the form of a swiveling arm.

7. The swiveling device as claimed in claim 1, wherein the receptacle is connected to the swiveling element by means of screws.

8. The swiveling device as claimed in claim 1, wherein the planes of the lateral portions of the receptacle enclose an angle of 30° to 45° with the first plane of the central portion of the receptacle, and wherein the planes of the inner lateral portions of the swiveling element enclose an angle of 30° to 45° with the plane of the central portion of the swiveling element, and wherein the planes of the outer lateral portions of the swiveling element enclose an angle of 30° to 45° with the plane of the adjacent inner lateral portion of the swiveling element.

9. The swiveling device as claimed in claim 1, wherein the receptacle makes contact with the swiveling element in a region of end-side planes of the swiveling element arranged parallel to a swivel axis of the output shaft.

10. The swiveling device as claimed in claim 9, wherein threaded bores pass through the end-side planes of the swiveling element, and wherein the receptacle is provided with holes for receiving screws configured to be screwed into the threaded bores.

11. The swiveling device as claimed in claim 1, wherein the swiveling device comprises a first swiveling device and a second swiveling device, wherein a tool for use in a motor vehicle industry is configured to be connected to the receptacle of the first swiveling device, or the second swiveling device for the tool is configured to be connected to the receptacle of the first swiveling device.

12. The swiveling device as claimed in claim 1, wherein the drive has an electric motor selected from the group consisting of a stepping motor and a brushless motor.

13. The swiveling device as claimed in claim 12, wherein the swiveling device has a worm gearing with an intermediate gearing mounted upstream, and wherein the output shaft is configured to be driven by the electric motor via the worm gearing.

14. The swiveling device as claimed in claim 1, wherein the output shaft receives a disk with a cover support for the conjoint rotation, and wherein the cover support contacts a stop fixedly connected to the housing in a defined end position of the swiveling element.

\* \* \* \* \*